United States Patent
Ramakrishnan et al.

(10) Patent No.: US 8,544,051 B1
(45) Date of Patent: Sep. 24, 2013

(54) BROADCAST SOLUTION FOR CABLE IPTV

(75) Inventors: Sangeeta Ramakrishnan, San Jose, CA (US); Prasanna Mucharikar, San Jose, CA (US); Gitesh Shah, San Jose, CA (US); Harshavardhan Parandekar, San Jose, CA (US); Tung-Fai Chan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 12/414,571

(22) Filed: Mar. 30, 2009

(51) Int. Cl.
*H04N 7/173* (2011.01)

(52) U.S. Cl.
USPC .......................................... 725/111; 725/93

(58) Field of Classification Search
USPC .................................................... 725/93, 111
See application file for complete search history.

(56) References Cited

U.S. PATENT DOCUMENTS

| | | | |
|---|---|---|---|
| 7,197,045 | B2 | 3/2007 | Amit |
| 7,701,938 | B1* | 4/2010 | Bernstein et al. ............. 370/390 |
| 2004/0073924 | A1 | 4/2004 | Pendakur |
| 2005/0289623 | A1* | 12/2005 | Midani et al. ................. 725/100 |
| 2007/0081537 | A1 | 4/2007 | Wheelock |
| 2007/0153820 | A1 | 7/2007 | Gould |
| 2007/0276905 | A1* | 11/2007 | Durand et al. ................ 709/203 |
| 2008/0144621 | A1 | 6/2008 | Huang et al. |
| 2008/0209489 | A1* | 8/2008 | Joyce et al. ................... 725/111 |
| 2009/0083811 | A1* | 3/2009 | Dolce et al. ..................... 725/93 |
| 2009/0083813 | A1* | 3/2009 | Dolce et al. ..................... 725/93 |

FOREIGN PATENT DOCUMENTS

| | | |
|---|---|---|
| EP | 1231788 A1 | 8/2002 |

OTHER PUBLICATIONS

Cisco Technology, Inc., Wideband Channel Bonding Chapter 3, Cisco Cable Wideband Architecture, Cisco Cable Wideband Solution Design and Implementation Guide, Release 1.0. http://www.cisco.com/en/US/docs/cable/cmts/wideband/solution/guide/release_1.0/2compon.html, downloaded Mar. 25, 2009.

GoBackTV, Inc., Delivering IPTV over Cable . . . Today, GigaQAM®IP, Products CMTS-Bypass, 2007.

GoBackTV, Inc., GoBackTV Demonstrates Revolutionary CMTS-Bypass Solution for IPTV over Cable, Feb. 6, 2007.

Internet Group Management Protocol,Wikepedia. http://en.wikipedia.org/wiki/Internet_Group_Management_Protocol, downloaded Mar. 25, 2009.

SRC-PE 2.0.x Solutions Guide > Providing Premium Services in a PCMM Environment, Overview of a PCMM Environment, http://www.juniper.net/techpubs/software/management/src/src20x/sw-sdx-solutions/html/pcmm-overview2.html, downloaded Mar. 26, 2009.

(Continued)

*Primary Examiner* — Kieu Oanh T Bui
(74) *Attorney, Agent, or Firm* — Leon R. Turkevich (57) ABSTRACT

Methods and apparatus are disclosed for offering broadcast IPTV solutions over cable (HFC networks). Rather than bypass the CMTS, a reduced number of downstream ports are utilized for video streams. Each input video stream is streamed to a multicast group address. In one embodiment, several RF channels are configured so that they are RF spanned across all the Fibernodes in the CMTS service area. In an embodiment, an STB sends a service request for a desired video stream using an IGMP request, and the CMTS responds by issuing a DBC request to tune the corresponding CM to the RF channel that is carrying the requested stream. Preferably, the CMTS ports that carry the static multicast streams are RF spanned across all the Fibernodes, or a selected subset.

17 Claims, 5 Drawing Sheets

(56) References Cited

OTHER PUBLICATIONS

Cable Television Laboratories, Inc., Data-Over-Cable Service Interface Specifications DOCSIS 3.0, MAC and Upper Layer Protocols Interface Specification, p. 39, Dhttp://www.cablelabs.com/specifications/archives/CM-SP-MULPIv3.0-I08-080522.pdf, downloaded Mar. 26, 2009.

W. Fenner, Internet Group Management Protocol, Version 2, Network Working Group, Xerox PARC, Nov. 1997.
Verimatrix, VCAS™ for Cable IPTV Enabling IPTV over Cable Networks, Verimatrix, San Diego, CA.
Ron Hranac, An Overview; DOCSIS 3.0, Cisco C97-484593-00, 23 pages, 2008 Cisco Systems Inc., Cisco Public.

* cited by examiner

BROADCAST SOLUTION FOR CABLE IPTV

TECHNICAL FIELD

The present disclosure relates generally to the field of cable networks, and more specifically to distribution over cable networks of video-on-demand, IPTV broadcasting, and other forms of streaming multimedia content.

BACKGROUND

Figure 1:
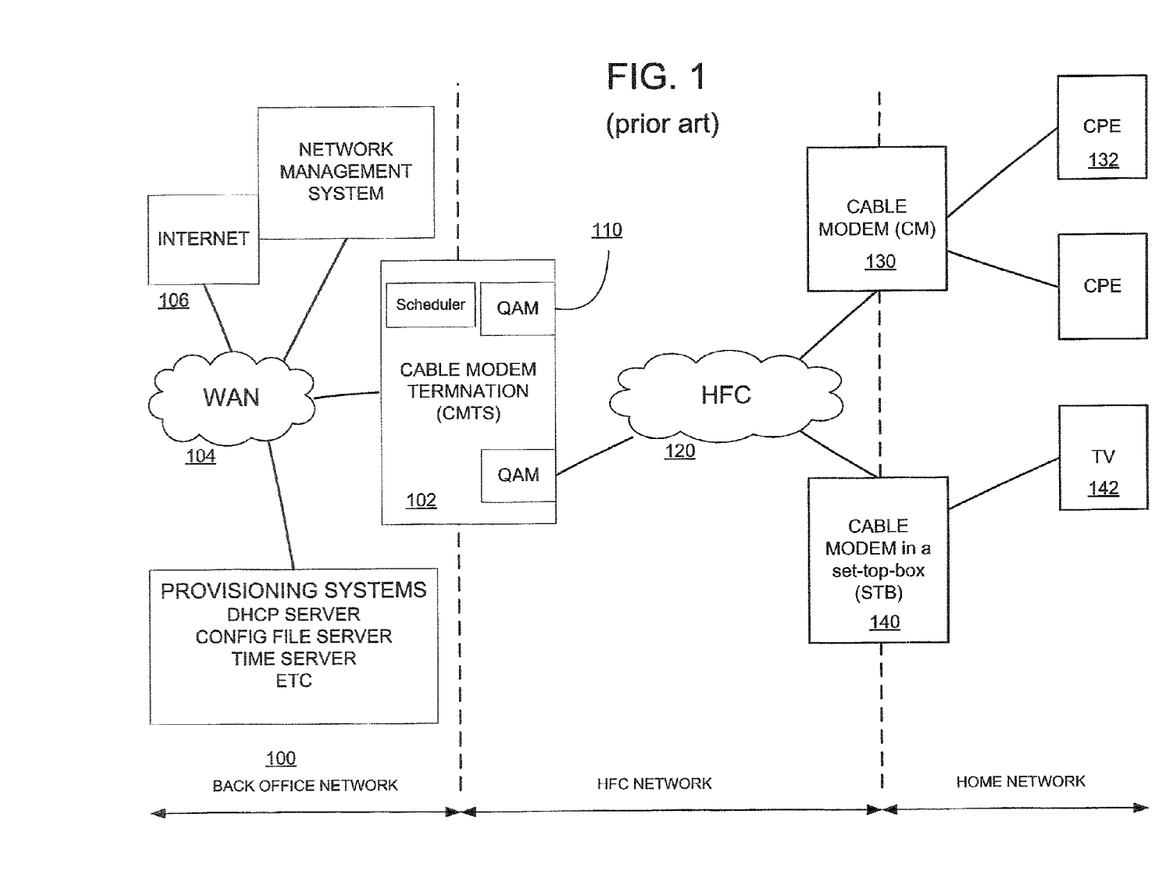
FIG. 1 is a simplified block diagram illustrating a DOCSIS network.

Selected Acronyms
CM Cable Modem
CPE Customer Premises Equipment (connects to CM)
CMTS Cable Modem Termination System (maybe integrated or modular)
    DOCSIS Data Over Cable Service Interface Specification
    DSBG Downstream Bonding Group
    DSID Downstream Service Identifier
    CMCI-Port Physical interface to which CPE can attach to a CM
    IGMP Internet Group Management Protocol (IPv4)
    PCMM Packet Cable Multimedia
Data Over Cable Service Introduction Cable operators have widely deployed high-speed data services on cable television systems. These data services allow subscriber-side devices, such as personal computers, to communicate over an ordinary cable TV network Hybrid Fiber Coax (HFC) cable. Cable Television Laboratories, Inc. (CableLabs®) publishes detailed technical specifications for such systems, including DOCSIS—Data Over Cable Service Interface Specification. Referring to FIG. 1, in a cable system 100, a Cable Modem Termination System (CMTS) 102 (or a modular CMTS called "M-CMTS") connects the cable network 104 to a data network, such as the Internet 106. In a modular CMTS architecture the DS MAC and PHY are separated, with the MAC residing in the M-CMTS core and the DS PHY being a part of the external EQAMs. (Some systems may utilize a Universal Edge QAM device, or "UEQAM" for short, which typically comprises a chassis having one or more gigabit Ethernet (GigE) input ports, and multiple QAM modulators and RF upconverters on the output (downstream) side.) A downstream QAM 110 receives data transferred from the CMTS over a packet switched portion of the network, performs modulation and other processing, and then transfers the modulated data over a Hybrid Fiber Coaxial (HFC) portion 120 of the cable network to subscribers. This is called the "downstream" direction.

In general, this HFC or coax cable feeds the last link (for example, over the last half mile or less) to an individual home or other structure. There, a cable modem (CM) 130 may provide a packet interface, for example Ethernet compliant, to various consumer premises equipment (CPE) 132 such as a personal computer. The CM may be connected to a hub or router (not shown), for example to implement a home network, wireless access, etc. The CM (or a second CM) may be implemented in other equipment, for example a "set-top-box" (STB) 140 which provides an interface to a television or other video display 142. A CM may serve multiple subscriber devices or "clients" on separate interfaces.

DOCSIS specifies that the cable modems obtain upstream bandwidth according to a request/grant scheme because the upstream channel is shared. A cable modem sends a bandwidth allocation request when it receives a packet from a subscriber device and the packet needs to be sent upstream into the cable network. The CMTS scheduler grants these requests using bandwidth allocation map ("MAP") messages.

MAP messages inform the CMs about specific allocations of upstream spectrum in the time dimension, using time slots or "minislots." The requesting modem then waits for its scheduled time before it can begin transmission. In this way, the system avoids collisions in upstream transmissions from multiple CMs.

In addition, individual CMs are assigned to specific frequency "channels." In this way, more than one CM may actually transmit at the same time, but they are separated by frequency division multiplexing. DOCSIS 3.0 allows a single CM to transmit on multiple upstreams (channels), as further discussed below. In other words, a DOCSIS 3.0 enabled CM may have multiple transceivers simultaneously operable at different frequencies. In some newer wideband CMs, a single transceiver may be tunable over multiple channels, within a given frequency range. DOCSIS 3.0 CM operate on at least four frequency channels concurrently.

Recently, especially in newer communities, service providers (or developers) are implementing fiber to the home (FTTH), in other words, running "fiber" or "glass" (optical fiber cable) all the way from the head and or distribution hub to the home. FTTH is desirable because it can carry high-speed broadband services integrating voice, data and video. Accordingly, separate traditional telephone lines (copper) may no longer be necessary. And coax to the home for internet access and television programming may be obviated as well. RF over Fiber ("RFoG") is advantageous because the analog RF signals transmitted over fiber (in the form of photons) incur little loss, even over run lengths of many miles, whereas losses over coax can be significant, requiring the use of repeaters or amplifier equipment every 1000 to 2000 feet. Fiber is also essentially immune to EM interference and unauthorized eavesdropping. In many existing systems, fiber runs only to a "Fibernode," from which point coax is used for the remaining segment to individual homes or office.
Television and Other Streaming Video Cable networks such as those described above have been widely deployed. Many households and businesses rely on cable modem connectivity for email and other Internet access. And many customers enjoy television programming delivery via the cable networks. "Cable TV" today comprises forwarding of both analog and digital broadcast television, as well as cable stations, i.e. stations that broadcast only via the cable network (as well as radio programming and some other services). The use of digital protocols such as IP (Internet Protocol) for streaming video content offers significant benefits. Among them is the ability to provide "IPTV" service in which a customer can select among a menu of digital TV stations or other digital content as explained below.

Several preferred examples of the present invention will now be described with reference to the accompanying drawings. Various other examples of the invention are also possible and practical. This application may be exemplified in many different forms and should not be construed as being limited to the examples set forth herein.

DESCRIPTION OF ILLUSTRATIVE EMBODIMENTS

The figures listed above illustrate examples of the application and operation of aspects of the invention. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

Figure 2:
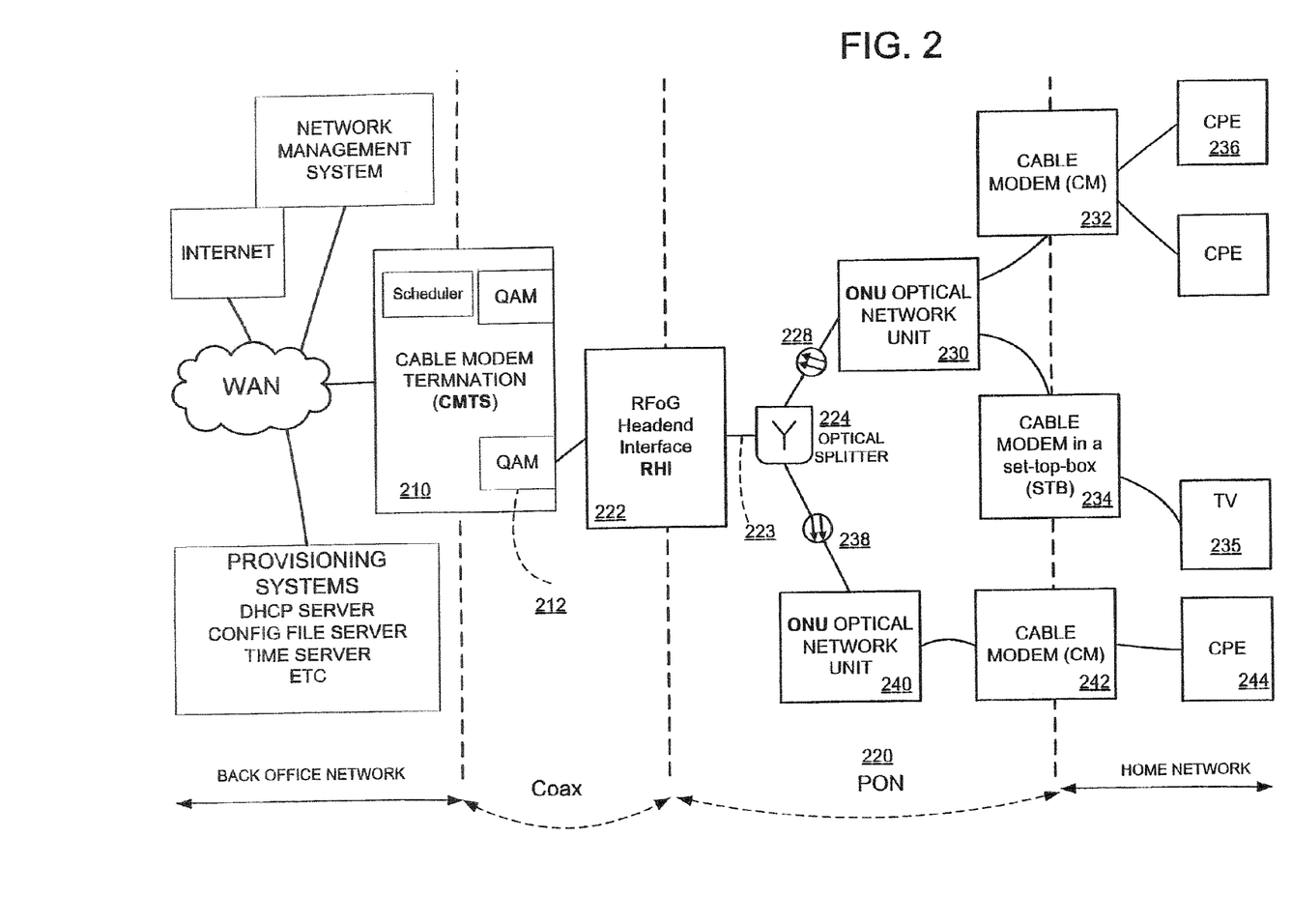
FIG. 2 is a simplified block diagram illustrating an RF over glass network.

To illustrate one example of an operating environment suitable for the present invention, a simplified FTTH network is described next, by way of illustration rather than limitation, with reference to FIG. 2. A QAM 212 of CMTS 210 is coupled to an RFoG Headend Interface ("RHI") 222 for converting the RF signals between coax and glass media; in other words, it provides an interface from coax to the passive optical network (PON) 220. At least one fiber 223 is coupled to the downstream side of the RHI 222. Fiber 223 may be coupled to a passive optical splitter 224. For example, splitter 224 may couple or "split" the signal from fiber 223 into, for example, 32-128 individual fibers 228, 238 (only two are shown). The splitter may be passive. It is bidirectional, acting as a collector or aggregator in the upstream direction, as further discussed later. In typical systems, an RHI is composed of an optical transmitter and EDFA (Erbium-Doped Fiber Amplifier) for downstream, an optical receiver for upstream, and a shared WDM module.

Downstream from the splitter, PON 220 may include one or more user nodes, called optical network units (ONUs). In FIG. 2, fiber 228 is coupled to Optical Networking Unit ONU 230, and fiber 238 is coupled to ONU 240. Each ONU may serve an individual home or building. In some embodiments, the ONU may serve on the order of 50 subscribers. In general, an ONU is a single integrated electronics unit that terminates the PON and converts optical signals to electronic signals on coax. It is also referred to as a "fiber node". The ONU typically will have little or no local "intelligence." The ONU may be located at a junction box, for example, on the outside of a building, in newer construction. Or, it may serve a group of houses.

A subscriber premises may have a cable modem (CM) 232, which in turn serves various attached customer premises equipment (CPE) 236, such as a computer, wireless router, etc. In another arrangement, a CM may be implemented in a set-top box (STB) 234, or otherwise coupled to an STB, as further discussed below, for delivery of video services such as IPTV. A television 235 is shown connected to the STB 234 for display of received video content.

In native MPEG deployments, most solutions are broadcast type architectures. All of the TV video streams would be carried all the time on a set of RF channels. (A single RF channel may carry several TV video streams.) The STB would tune to the RF channel where a desired TV steam could be found. Such MPEG deployments while well-suited to deliver video to traditional digital cable set-top-boxes, are not directly capable of connecting to IP end devices, such as PCs, hand-held devices and IPSTBs. Solutions of that type, however, occupy large amounts of spectrum.

Figure 3:
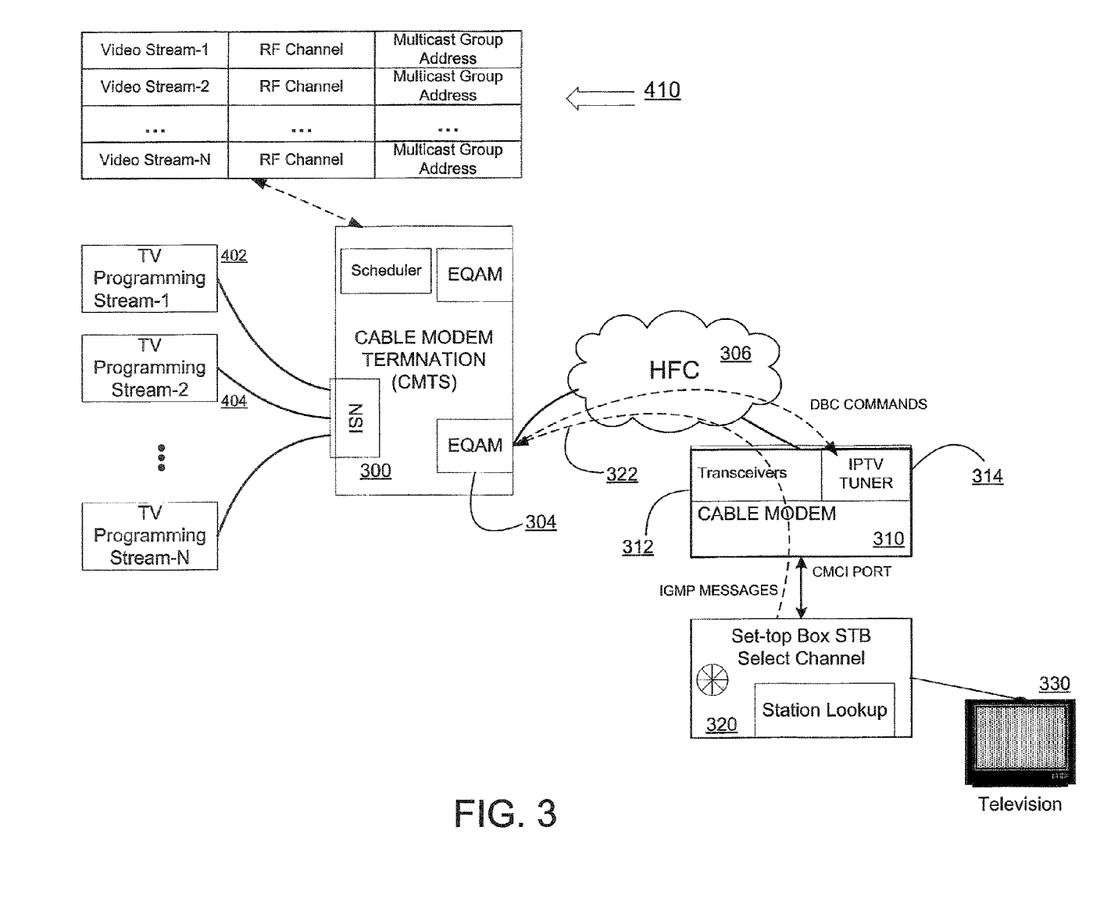
FIG. 3 is a simplified block diagram illustrating an IPTV over cable implementation.

FIG. 3 is a simplified overview illustration of elements of a cable network that provides IPTV (as well as other types of services). Here, a CMTS 300, as discussed earlier, includes at least one EQAM 304, for transmission over the HFC network 306 to subscribers. A CM 310 includes multiple transceivers 312, and one transceiver 314 dedicated to IPTV. Having one tuner reserved for IPTV is preferred but not a requirement, as further explained below. A set-top box (STB) 320 is coupled to, or includes, the CM 310. Finally, a television 330 is connected to the STB as before. The STB 320 enables a user, via front panel or remote control, to select desired video programming for display on the television. (The STB may have other functions as well, not pertinent here.)

In an embodiment, the STB enables "station" selection, for example by cable service "channel number" (typically a two or three digit integer), or call letters ("KATV" "KOIN") or other well-known video broadcast source identifiers ("ESPN" "CNN" "OPB" etc.) or some combination of these identifiers. Content from each of these sources is delivered to the cable network as a unique IPTV stream. Referring again to FIG. 3, these input streams 402, 404 for example, may be provided to the CMTS 300 via an IP network, or any other suitable packet-switched protocol. The CMTS typically maintains a database, lookup table, or the like, illustrated at 410, which stores the corresponding multicast group address for each input stream. In addition, the CMTS assigns an RF channel to each stream, as further explained below.

In one embodiment, the STB 320 maintains a database, lookup table, or the like (not shown), that stores the correspondence between the popular station identifiers ("ESPN" etc.) and the corresponding video stream multicast group address. This information is used, as explained below, for the STB to request the programming selected by a user for recording or display. In some embodiments, the STB may acquire or update the programming-to-multicast address mapping via a middleware application. In an embodiment, the STB or other subscriber equipment may request an entire mapping of available streams, or an update of the mapping, or just the mapping for one or more specific streams. In another alternative, these mappings may be predetermined, and stored in memory, or downloaded from a third party resource such as a website in advance or in real time.

Figure 5:
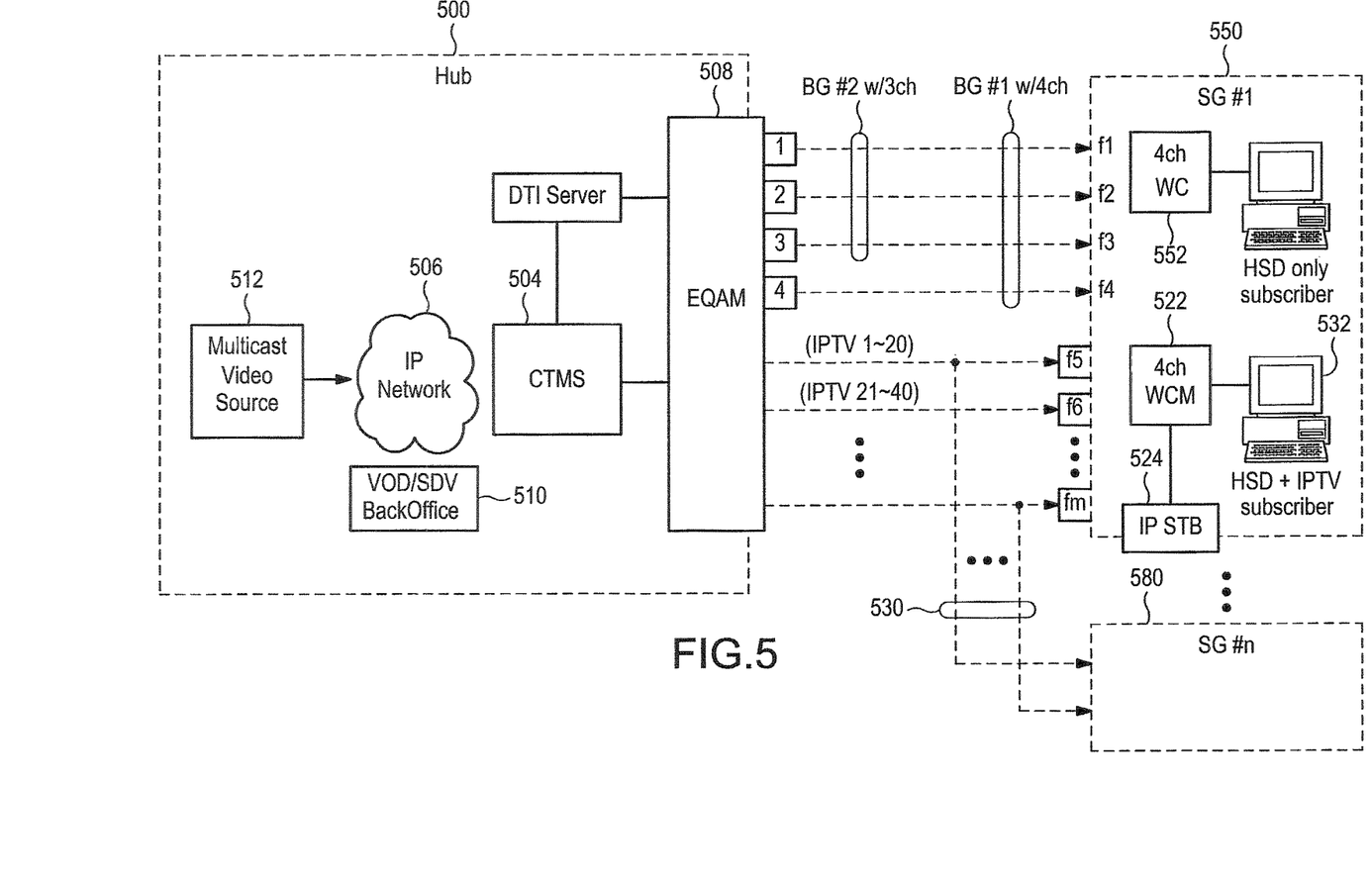
FIG. 5 is a simplified block diagram of a cable system network architecture arranged for delivery of IPTV services.

Referring now to FIG. 5, a simplified block diagram illustrates one example of a cable system network architecture suitable for delivery of IPTV services. Here, a hub 500 may includes several CMTS's. For illustration, only one CMTS 504 is shown. The CMTS 504 is coupled to an IP Network 506 for IP data communications (using data in its broadest sense). An video-on-demand (VOD) and or SDV (Switched Digital Video) server or "back office" 510 may be coupled to the IP Network to provide corresponding services to the hub. Other multicast video sources 512 may be coupled to the IP network as well. These sources may include one or more of various encoders, ad-insertion equipment, satellite receivers, statistical multiplexers or local encoders. A VOD server may provide unicast video sources. (A modular CMTS is shown but an integrated CMTS can be used as well.)

The CMTS 504 is coupled to an edge QAM or EQAM 508. Typically, a CMTS may have 40 downstreams, although the specific number is not critical here. For illustration, we indicate them as downstreams f1 through fm. In operation, each of the TV streams that need to be offered (e.g. from sources 512) will be streamed to a multicast group address. In one embodiment, one or more RF channels are configured on the CMTS such that they are "RF spanned" across all the Fibernodes served by the CMTS. In other words, the selected RF channels are split to all the Fibernodes served by the CMTS so that they can potentially reach all of the subscribers served by the CMTS. Typically, each CMTS might serve 40 Fibernodes.

In another embodiment, the downstreams may be RF spanned across one or more subsets of the Fibernodes served by the CMTS. For example the FNs served by a CMTS may belong to multiple ad-zones. So different FNs should receive different copies of the stream. Thus CNN itself may be available on two different multicast addresses, each with different Ads on it, and these can be spanned across an appropriate subset of the Fibernodes. In an embodiment, there may be multiple sets of RF channels that are each RF spanned across a different subset of FNs served by the CMTS.

A downstream channel (DS) has, e.g., around 38.8 Mbps of bandwidth. The downstream channel is transmitted by a QAM port. Each channel is defined by a predetermined frequency and related parameters. Multiple input streams (video streams) (402 in FIG. 3; from IP Network 506 in FIG. 5) may be assigned to each DS. For example, a typical input stream may have a bandwidth of 2 or 3 Mbps. So, depending on the selected streams, there may be on the order of 5 or 10 input streams (multicast streams) on each downstream channel. This number can vary and may be larger. Thus the total number of RF channels required at a given time will depend on the number and bitrates of the TV streams.

In some architectures the CMTS may carry all TV input streams via static multicast, or using a combination of static and dynamic, for example, where the most popular content is configured to be carried statically while the less popular content is carried dynamically. Here we are concerned with the static multicast streams. Thus all of the streams of interest are typically statically multicast on the assigned RF channels. Although described in the context of static multicast streams, the invention is also applicable to dynamically multicast streams. If the set of downstreams are RF spanned across a large number of FNs, the gains of using dynamic multicast over static multicast may be minimal. Next we describe delivery of the requested programming streams to individual subscribers in some preferred embodiments.

Referring again to FIG. 5, a CM 522 in a household that has subscribed to the IPTV service typically will have at least one tuner dedicated to IPTV. (It is possible in alternative embodiments that only when an endpoint device requests a video stream does a CM tuner become dedicated to video. Otherwise that tuner could also be used for data. Dynamically based on a video request, the CMTS could remove this tuner from HSD service and use it for video.) Depending on the program request from the STB 524, this tuner will be moved to the appropriate frequency, i.e., the channel that contains the requested program stream. In a presently preferred embodiment, the STB sends an IGMP request, for the program selected by the subscriber or user. On receiving the IGMP request, the CMTS identifies the RF channel that is carrying the requested multicast stream. For example, in FIG. 3, the STB 320 sends an IGMP request 322 to CMTS 300. The CMTS conducts a lookup in datastore 410 and determines the assigned channel for the requested stream. This can be done using the multicast group address provided by the STB in the request message.

In response, the CMTS then issues a DBC (Dynamic Bonding Change) Request message to the CM. The CMTS changes the Receive Channel Set (RCS) of the CM to include the identified channel corresponding to the stream requested by the STB. (Typically, the CMTS lists the complete set of frequencies the CM must tune to, although only a single frequency is being changed.) The CM then tunes to the new frequency received via DBC, and forwards the requested multicast stream to the STB. In an embodiment, the CM supports MDF enabled mode, i.e., multicast DSID forwarding. For example, the STB reads the packet headers and selects those having the multicast group address that corresponds to the stream selected by the user. The STB processes the stream and delivers the content to the television or other CPE. Although we refer to an STB is this description, other devices with similar functionality may be used. In general, the "endpoint" may be a PC, for example, a hand-held device or any other IP device capable of consuming video. For example, a hand-held device such as an iPod® or Blackberry® may be coupled to a CM via a wireless router.

Figure 4:
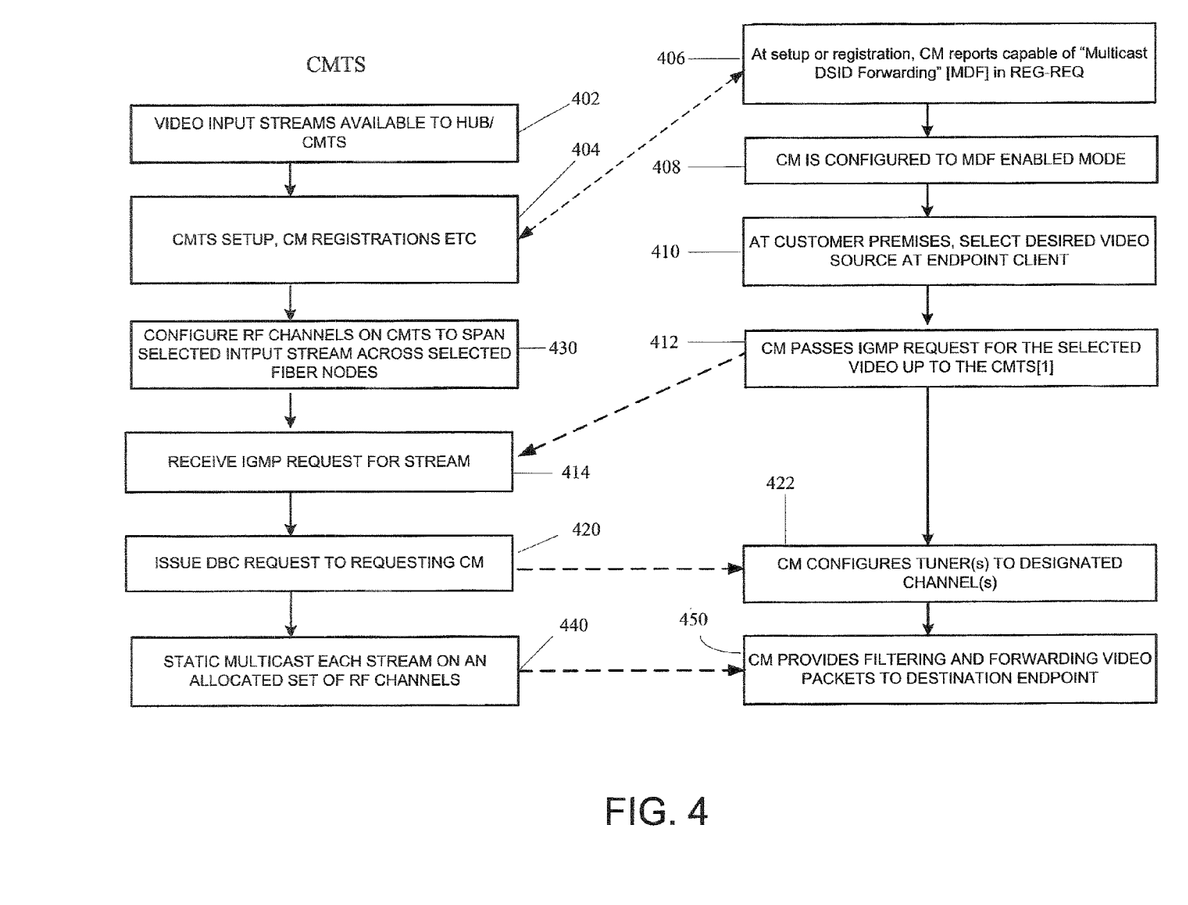
FIG. 4 is a simplified flow diagram illustrating selected aspects of a process for providing IPTV services over a cable plant.

FIG. 4 is a simplified flow diagram illustrating the foregoing process. In FIG. 4, CMTS activities are generally shown on the left side, and CM activities are shown on the right. Details are omitted to not obscure the broader concepts of this embodiment. As mentioned, various video input streams are available to the CMTS, illustrated at block 402. During the usual CM registration procedures, block 404, the subject CM reports its MDF (Multicast DSID Forwarding) capability, 406, and it is configured with MDF enabled mode, 408. This feature may be used to filter and forward video stream packets to the appropriate client of the CM. The CMTS, as explained, configures RF channels to span selected input streams across selected fibernodes, block 430.

When a user at the customer premises selects a desired video source, block 410, for example using an STB, the STB generates an IGMP request message, and the CM passes that message upstream to the CMTS, block 412. The message is received at the CMTS, block 414, and the CMTS identifies the RF channel to which the requested input stream had been assigned. The CMTS then issues a DBC request message directed to the requesting CM, see block 420, and the CM, upon receiving the request, configures its receivers/tuners as requested so as to include the appropriate channel, block 422, to receive the requested stream. In block 450, the CM provides filtering and forwarding the received packets to the requesting endpoint.

Preferably, the CM also supports channel bonding. For example, FIG. 5 illustrates a first service group SG #1 550 that includes, for simplicity, two subscribers. A first subscriber is associated with a 4-channel CM 552, and that user subscribes to HSD service only. A bonding group BG#1 consists of four channels (f1-f4) and may serve that CM 552. The first subscriber is not a TV subscriber, so no tuner is used for TV reception. Another bonding group BG #2 illustrates use of three bonded channels f1-f3.

Additional downstreams f5-fm from EQAM 508 may be RF spanned across multiple service groups SG #1 to SG #n 580. These may span across some or all of the Fibernodes served by the CMTS. Video streams may be assigned in various configurations. For example, streams 1-20 on channel f5, streams 21-40 on channel f6, etc. In some cases, channels may be bonded to deliver more or higher bandwidth steams. For, illustration, a second subscriber, also in SG #1 (but not necessarily so) is associated with CM 522 which in turn is implemented in, or coupled to, an STB 524. At least one tuner in the CM is dedicated to video, which in the case of a 4 channel CM would leave three channels available for HSD services. In general, any CM in any of the SG's could tune to one or more of the IPTV channels as described herein to receive requested IPTV video streams. This is just one example of using multiple tuners. Various configurations may be used, depending on the number of streams, bitrates, number of CM tuners, etc.

In some embodiments, one tuner on the CM may be dedicated to video. This reduces the number of tuners available to HSD service. To avoid this limitation, bonding groups may be configured, for example, to provide a 3-channel BG for HSD for those CMs that have subscribed to HSD+IPTV (assuming a 4 channel CM), and a 4-channel BG for HSD for those CMG that have subscribed to HSD service only. In that way, while one tuner is dedicated to IPTV, the HSD-only users will have all four channels available to HSD bandwidth. In another embodiment, all subscribers may have a common size of bonding group for HSD, say 3 channels. In some embodiments, two or more channels may be dedicated to IPTV. These channels may be received via one or more receivers or tuners.

Above we described a single video stream per home using one dedicated tuner for video, in another embodiment two or more video streams per CM may be supported. this may be implemented, for example, using multiple agile tuners in the CM or having block tuners with wide capture windows. Various alternatives are contemplated depending on the specific CM and numbers of transceivers and tuners available at the subscriber premises.

Video Streams

In general, each of the multicast streams may be a carried as a MPEG transport stream in the payload of a UDP/IP packet. Typically the streams will be Constant Bit Rate (CBR), but they could also be carried as Variable Bit Rate (VBR), which are 30-40% more bandwidth efficient than CBR streams. In the case of VBR streams, an encoder/statistical remultiplexer (see 512 in FIG. 5) preferably would ensure that the aggregate bandwidth of the video streams is less than the bandwidth of a single RF channel. To provide a good user experience, the channel change time preferably should be as small as possible. Toward that end, the CMTS should be arranged so as to process IGMP requests and issue appropriate DBC messages relatively quickly. For example, a search algorithm to identify the assigned RF channel should be relatively efficient. In one embodiment, hash tables may be used for that purpose.

Alternative Embodiments

In one embodiment, a static multicast solution may allocate only a single RF channel for multicast video streams. There may be no DBC-type ability in some systems to re-tune the CM to listen to another RF channel. In this case, only about 40 or 50 Mbps may be available for video. This limits the number of TV programs that can be offered to about 20, for SD content encoded for example with H.264 coding at 2 or 2.5 Mbps. Such embodiments, while not preferred, are still operational and provide some of the benefits described above.

In some embodiments. IPTV service may utilize a dynamic multicast configuration in the CMTS. In this approach, some bandwidth is set aside for each Fibernode to carry multicast streams. The CMTS forwards only the multicast streams that are currently joined by subscribers in the corresponding Fibernode. This approach is very spectrum efficient for small sized Fibernodes (relatively few subscribers), because although an MSO may offer 250 TV channels, only the channels that are currently being viewed by subscribers in this Fibernode need to be forwarded.

In the dynamic approach, the steams therefore are not RF spanned over all Fibernodes. Each Fibernode has its own allocated set of DS Downstreams. The CMTS forwards to each Fibernode, on the allocated DS(s), only the streams requested by subscribers on the node. Where the same program is requested by subscribers on different Fibernodes, the CMTS replicates the corresponding streams. Still this approach generally represents a significant savings of spectrum, since only steams actually requested at the time are forwarded. In that regard, fewer RF channels are needed to carry those streams. We have described several embodiments in the context of using IGMP messaging. The concepts of the present disclosure can also be implemented using other signaling mechanisms, including but not limited to PCMM, PacketCable Multimedia protocols. In the PCMM framework, an Application Manager provides an interface to policy server(s) for the purpose of requesting QoS-based service on behalf of a subscriber or a network management system. It maps session requests to resource requests and creates policies. A policy server acts as a policy decision point and policy enforcement point and manages relationships between application managers and cable modem termination system (CMTS) devices. A PCMM system can be arranged to implement cable IPTV services as disclosed herein by using the PCMM signaling mechanisms instead of IGMP messaging. In such cases, a client requests a multimedia service from an application manager. The application manager relays the request to a policy server. The policy server is then responsible for provisioning the policies on a CMTS device.

Most of the cable plant equipment discussed above comprises hardware and associated software. For example, the typical CMTS. EQAM or CM is likely to include one or more processors and software executable on those processors to carry out the operations described. We use the term software herein in its commonly understood sense to refer to programs or routines (subroutines, objects, plug-ins, etc. etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the cable plant components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" or "computer-readable" and may be used store executable instructions for implementing various embodiments of the present invention for mail piece sorting and related operations.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A method for delivering digital video programming via a cable system network, the method comprising:
   receiving at least one digital video programming input stream at a cable system hub;
   assigning each received input stream to an RF channel for downstream delivery;
   spanning the assigned RF channels over multiple fiber nodes of the cable system network using the cable system hub;
   forwarding each input stream over the assigned RF channel for multicast downstream delivery to subscribers;
   receiving a video stream request sent from a subscriber equipment to an application manager using Packet Cable MultiMedia (PCMM) signaling in a PCMM architecture environment; and
   the application manager informing the subscriber equipment of a multicast address corresponding to the video stream request, enabling the subscriber equipment to use the multicast address to receive and decode the corresponding input stream that is forwarded over the assigned RF channel as a multicast data stream.

2. The method of claim 1 including spanning the assigned RF channels over a selected subset of the fiber nodes of the cable system hub service area.

3. The method of claim 1 including selecting a number of RF channels to assign for video input stream delivery responsive to the number and bitrates of the input streams.

4. The method of claim 1 including spanning the assigned RF channels over all of the fiber nodes of a service area of the cable system hub using static multicasting.

5. The method of claim 1 and further comprising:
   identifying the RF channel to which a selected input stream of the received video stream request is assigned; and
   commanding the subscriber equipment to tune to the identified RF channel in order to receive the selected input stream.

6. The method of claim 5 wherein:
   the video stream request from the subscriber equipment is received in the form of an Internet Group Management Protocol (IGMP) message; and
   the command to tune the subscriber equipment comprises a Dynamic Bonding Change (DBC) command.

7. The method of claim 6 wherein:
   the IGMP message originates in a set-top box coupled to a cable modem (CM); and
   the DBC command is directed to the CM associated with the set-top box.

8. The method of claim 1 and further comprising:
   relaying the video stream request to a policy server; and
   the policy server provisioning the cable system hub for forwarding a requested input stream of the video stream request over an assigned RF channel for downstream delivery to subscribers.

9. The method of claim 1 wherein the foregoing steps are executed in a DOCSIS-3.0 compliant, integrated or modular Cable Modem Termination System (CMTS) and at least one of the input streams carries IPTV television programming.

10. An apparatus comprising:
    a video output interface for output of video content to a display or recording device;
    an interface for connection to a cable modem device;
    a user interface to enable user selection of a desired video programming stream; and
    a processing device configured to:
    map the user selected video programming stream to a corresponding multicast group address;
    send a request upstream via the cable modem device interface to request the user selected video programming stream, the request including identification of the corresponding multicast group address; and
    receive the requested video stream as a multicast data stream having the multicast group address via a cable modem and processing the requested video stream based on the multicast group address to deliver decoded content to the video output interface;
    wherein the processing device is configured to store television station-to-multicast group address mappings.

11. The apparatus according to claim 10, wherein the apparatus comprises a PC, portable device, set-top box, or other IP-enabled device capable of consuming digital video data.

12. The apparatus according to claim 10, wherein the processing device is configured to send an Internet Group Management Protocol (IGMP) message to request the user selected video programming stream.

13. The apparatus according to claim 10, wherein the processing device is configured to send Packet Cable MultiMedia (PCMM) signaling to an application manager to request the user selected video programming stream.

14. A Cable Modem Termination System (CMTS) comprising:
    a network interface to receive multicast IP video input streams; and
    a processing device configured to:
    store a corresponding multicast group address for each IP video input stream;
    select at least one of the IP video input streams and assign each selected IP input stream to a corresponding RF channel for downstream delivery;
    span the corresponding RF channels downstream to a selected set of Fibernodes coupled to the CMTS for multicast downstream delivery to subscribers;
    receive a message requesting a selected one of the IP video input streams; and
    responsive to the request message, issue instructions to cause a cable modem (CM) associated with the request message to tune its receiver to the corresponding RF channel assigned to carry the selected IP video input stream, enabling the cable modem to use the corresponding multicast group address to receive the selected IP video input stream that is forwarded over the assigned RF channel as a multicast data stream.

15. The CMTS according to claim 14 wherein: the CMTS is substantially DOCSIS 3.0 compliant;
    the request message comprises an Internet Group Management Protocol (IGMP) message; and
    the instructions to the CM comprise a dynamic bonding change (DBC) request message to cause the CM associated with the request to tune its receiver to the corresponding RF channel assigned to carry the selected video stream.

16. A method for a cable subscriber to receive IPTV programming, comprising:

at the subscriber premises, selecting a desired video programming stream;

at the subscriber premises, mapping the video stream selection to a corresponding multicast group address;

at the subscriber premises, transmitting a request message that includes the corresponding multicast group address;

at the subscriber premises, receiving a multicast address responsive to transmitting the request;

at the subscriber premises, tuning a receiver to an RF channel using the received multicast address to receive the selected video stream as a multicast data stream; and at the subscriber premises, decoding the received video stream for display of the selected video stream.

17. The method according to claim 16 wherein said receiving further comprises receiving a downstream message originating from a Cable Modem Termination System (CMTS), wherein the downstream message includes the multicast address and identifies the RF channel that includes the selected video stream.

* * * * *